United States Patent [19]

Franz, Jr.

[11] 4,352,049

[45] Sep. 28, 1982

[54] BRAKE CONTROL APPARATUS AND METHOD

[75] Inventor: James H. Franz, Jr., Murrysville, Pa.

[73] Assignee: Westinghouse Electric Corp., Pittsburgh, Pa.

[21] Appl. No.: 97,275

[22] Filed: Nov. 26, 1979

[51] Int. Cl.³ .............................................. H02P 3/14
[52] U.S. Cl. .................................... 318/370; 318/376; 318/269
[58] Field of Search .............. 318/376, 380, 367, 368, 318/370, 371, 269, 139

[56] References Cited

U.S. PATENT DOCUMENTS

| | | | |
|---|---|---|---|
| 3,593,089 | 7/1971 | Appelo | 318/376 |
| 3,657,625 | 4/1972 | Miller et al. | 318/376 |
| 3,947,740 | 3/1976 | Tsuboi | 318/380 |
| 4,051,421 | 9/1977 | Brinner et al. | 318/380 |
| 4,096,423 | 6/1978 | Bailey et al. | 318/380 |
| 4,123,693 | 10/1978 | Anderson et al. | 318/376 |
| 4,126,420 | 8/1980 | Jinbo et al. | 318/370 |

FOREIGN PATENT DOCUMENTS 131507  6/1978  Fed. Rep. of Germany ...... 318/368

Primary Examiner—David Smith, Jr.
Attorney, Agent, or Firm—R. G. Brodahl

[57] ABSTRACT

The electric braking of a passenger vehicle is described, wherein the current generated by the propulsion motor in the brake mode of operation is distributed between the power supply line and a dynamic brake resistor circuit in response to the filter capacitor voltage, and with the operation of the dynamic brake resistor circuit being controlled relative to the chopper thyristor with a predetermined frequency of operation.

6 Claims, 10 Drawing Figures

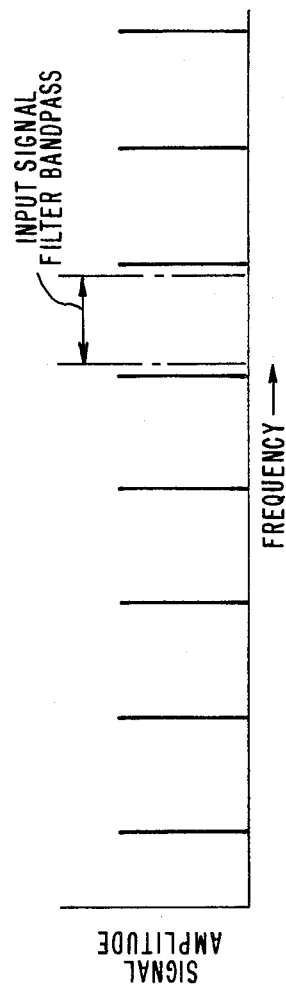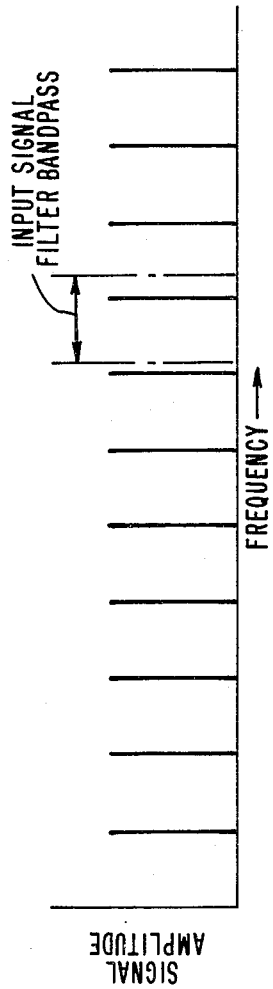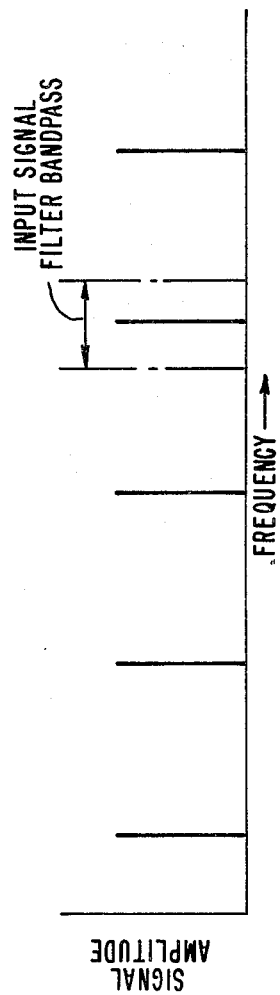

4,352,049

BRAKE CONTROL APPARATUS AND METHOD

CROSS-REFERENCE TO RELATED APPLICATIONS

The present invention is related to the following previously filed patent applications, which are assigned to the same assignee;

Ser. No. 876,310 now issued as U.S. Pat. No. 4,173,732 which was filed on Feb. 9, 1978 by L. W. Anderson and is entitled "Dynamic Brake Current Limiting Control Apparatus and Method", Ser. No. 964,313 now issued as U.S. Pat. No. 4,225,813 which was filed on Nov. 11, 1978 by A. P. Sahasrabudhe and is entitled "Transit Vehicle Dynamic Brake Control Apparatus", and Ser. No. 967,821 which was filed on Dec. 8, 1978 by R. R. Lewis and D. C. Graham and is entitled "Regenerative Braking Control for a Transit Vehicle".

BACKGROUND OF THE INVENTION

The present invention relates to the electric braking of a transit vehicle with a brake effort request P signal indicating the desired brake effort, and with the receptivity of the power supply line determining how much electric braking energy is regenerated to the power supply line and how much is dissipated in the dynamic braking resistors.

In an article entitled "Propulsion Control for Passenger Trains Provides High Speed Service" that was published in the Westinghouse Engineer for September, 1970 at pages 143–149 there is discussed the operation of the P signal to establish the requested brake effort in the brake mode of operation.

In an article entitled "Alternative Systems for Rapid Transit Propulsion and Electrical Braking" that was published in the Westinghouse Engineer for March, 1973 at pages 34–41 there is discussed the thyristor chopper operation for dynamic braking, with the generating motors providing output current that is either returned to the supply line or dissipated in a dynamic braking resistor by turning on the thyristor T5 shown in that article. The thyristor chopper is fast enough to match regenerated voltage-to-line voltage.

Electric braking effort depends upon the kinetic energy stored in the vehicle and employs the propulsion motors to generate electrical energy that is regenerated back to the power supply line or is dissipated in provided resistors as a function of the current that flows in the resistors. At higher vehicle speeds since the back EMF of the motors is high, more effective electric braking can be provided then at lower speeds. Therefore, when electric braking as compared with mechanical friction braking is to be provided, it is usually desirable first to apply more of the electric braking at higher speed and as the vehicle slows down, then to apply more of the mechanical friction braking.

It is known in the prior art to monitor the line filter capacitor voltage to determine the receptivity of the power supply line for such regenerative power such that if the capacitor voltage goes above a preset limit, then the regenerative braking to the power supply line is terminated and either dynamic braking or friction braking is used to stop the vehicle as disclosed in U.S. Pat. No. 3,657,625 of Miller et al. and U.S. Pat. No. 3,593,089 of Appelo.

It is known in the prior art as disclosed in U.S. Pat. No. 4,123,693 of L. W. Anderson et al. to provide a programmed microprocessor to sense the line voltage and control the current that is generated by the vehicle motor in the brake mode in relation to at least one predetermined limit of the power supply line voltage.

SUMMARY OF THE INVENTION

A dynamic and regenerative braking control for a transit vehicle is provided wherein electric current generated by the motor is distributed between the power supply line and a provided dynamic braking resistor in accordance with the voltage of the power supply line, with the braking control circuit being controlled to have a predetermined frequency of operation.

DESCRIPTION OF THE PREFERRED EMBODIMENT

Figure 1:
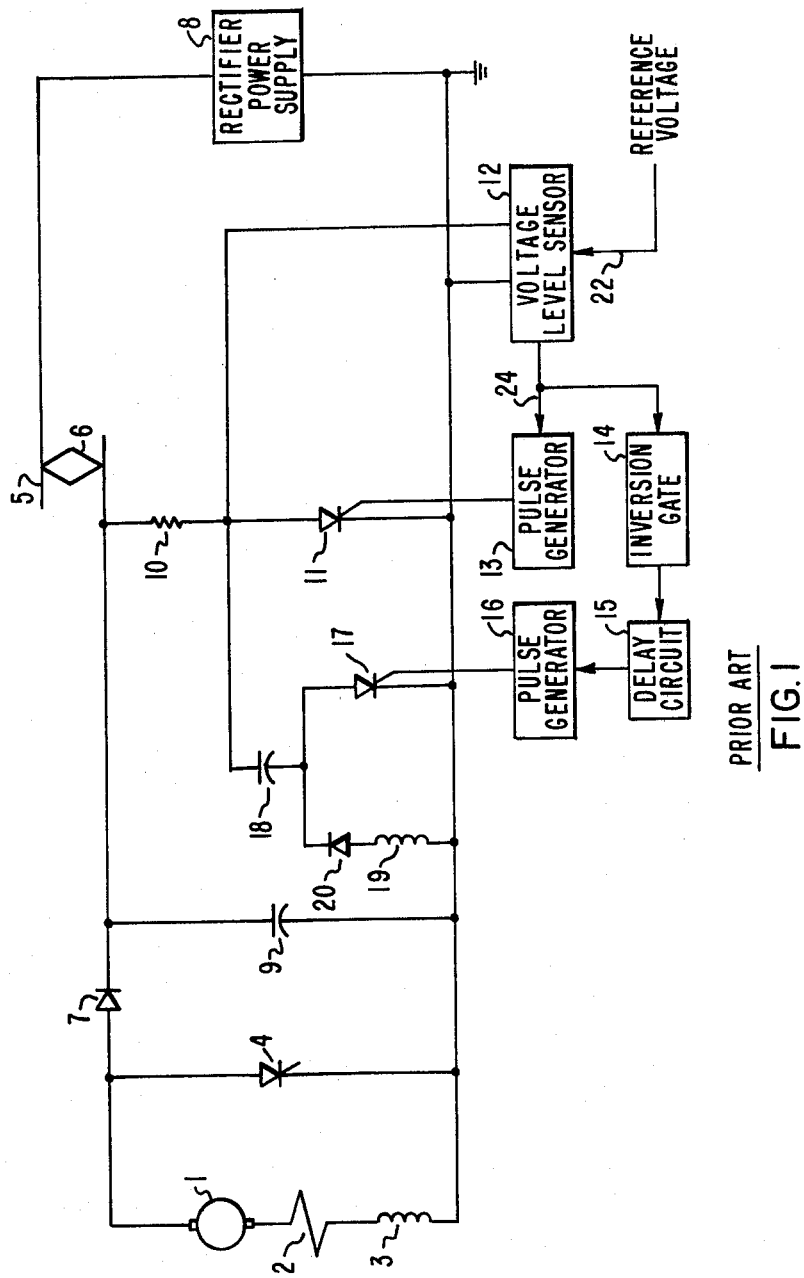
FIG. 1 schematically shows a prior art transit vehicle dynamic and regenerative brake control apparatus operative with a power supply line.

In FIG. 1 there is shown a dynamic and regenerative braking control apparatus, such as described in U.S. Pat. No. 3,577,055, including a direct current series motor 1 typically used for the propulsion of a transit vehicle and with the circuit arrangement for the brake mode of operation being shown. The motor armature 1 is connected in series with the field winding 2 and the motor reactor 3. A chopper thyristor 4 is connected across the motor and is provided with well-known firing and commutation circuits, not shown. The motor is energized through a collector 6 by a power supply line 5 which is fed by a rectifier power supply station 8. A freewheeling diode 7 prevents the power supply 8 from being short circuited across the thyristor 4. A line filter capacitor 9 is connected across the thyristor 4. When the motor is generating current during a vehicle braking operation, any excess current that cannot be received by the power supply line 5 without having the line voltage increase too high is absorbed by the dynamic braking resistor 10 as determined by the series-connected thyristor 11. To control the conductivity of the thyristor 11 a voltage level sensor 12 is provided to sense the voltage across the line filter capacitor 9 in relation to a desired reference voltage 22. When a line voltage above the reference voltage is sensed, an output signal 24 is provided by the level sensor 12 which causes the pulse generator 13 to fire the thyristor 11 to connect the resistor 10 to draw current from across the filter capacitor 9. The same output signal 24 initiates the delay circuit 15 through the inversion gate 14. At the end of the provided delay time period of the circuit 15, the pulse generator 16 provides a pulse to fire the commutation thyristor 17 within the commutator circuit including the capacitor 18, the inductor 19 and a diode 20. During the braking operation the braking effort is controlled by the conductivity of the chopper thyristor 4. When the thyristor 4 is conductive, the motor 1 is short circuited and the motor current increases and when the motor current is sufficiently high, the thyristor 4 is blocked. Due to the inductance in the motor circuit the current flows through the freewheeling diode 7 to the power supply line 5 in accordance with load objects such as other transit vehicles which are connected to the power supply and this causes the generated current to decrease. By altering the relative conductivity of the chopper thyristor 4 the effective load resistance and thus the braking effort provided by the motor 1 can be determined. The generated energy by the braking motor 1 is fed back to the power supply line 5 when that power supply line 5 is loaded by other transit vehicles such that it can absorb the energy generated by the motor and under such operation the thyristor 11 is not conductive. If, however, the braking operation occurs when the power supply line 5 cannot accept the brake generated energy, the voltage of the power supply line 5 will increase at a rate determined by the size of the line filter capacitor 9 and the generated motor current. Since the capacitance of the line filter capacitor 9 is usually relatively small, this voltage increase takes place very rapidly. The voltage level sensor 12 determines the voltage across the filter capacitor 9 in relation to the reference 22 and when this capacitor voltage exceeds the reference voltage, a signal 24 is provided by the voltage level sensor 12 which initiates the operation of the pulse generator 13 which in turn emits firing pulses to the thyristor 11 to connect the dynamic braking resistor 10 across the line filter capacitor 9. The output signal 24 from the voltage level sensor 12 also initiates the delay circuit 15 and after a delay time T the delay circuit 15 emits a control signal to the pulse generator 16 which sends a firing pulse to the commutating or extinguishing thyristor 17. The delay time period T is selected in relation to the resistance of the dynamic braking resistor 10, the capacitance of the filter capacitor 9 and the difference between the reference voltage which may, for example, be 900 volts and the maximum network voltage, for example, 850 volts arising in normal operation of the circuit shown in FIG. 1. Before the thyristor 11 is fired to be conductive, the capacitor 18 has been charged to the voltage of the power supply line 5 by operation of the extinguishing thyristor 17 with plus potential on the upper capacitor plate. When the thyristor 11 is fired to become conductive, the capacitor 18 will be recharged by means of the inductance coil 19 and the diode 20 so the capacitor obtains a plus potential on its lower plate of capacitor 18. Thereafter when the extinguishing thyristor 17 is fired to become conductive, the voltage of the capacitor 18 will be placed as a blocking voltage across the thyristor 11 so that the thyristor 11 is extinguished. The capacitor 18 is then recharged with less potential on its upper plate and since the thyristor 11 is now extinguished and not conductive, the motor 1 can again start to feed generated current energy to the power supply line 5 if the power supply line 5 can absorb the energy. Otherwise, the voltage across the capacitor 9 will again increase and the dynamic braking resistor 10 will be again connected across the filter capacitor 9 as previously explained.

Figure 2:
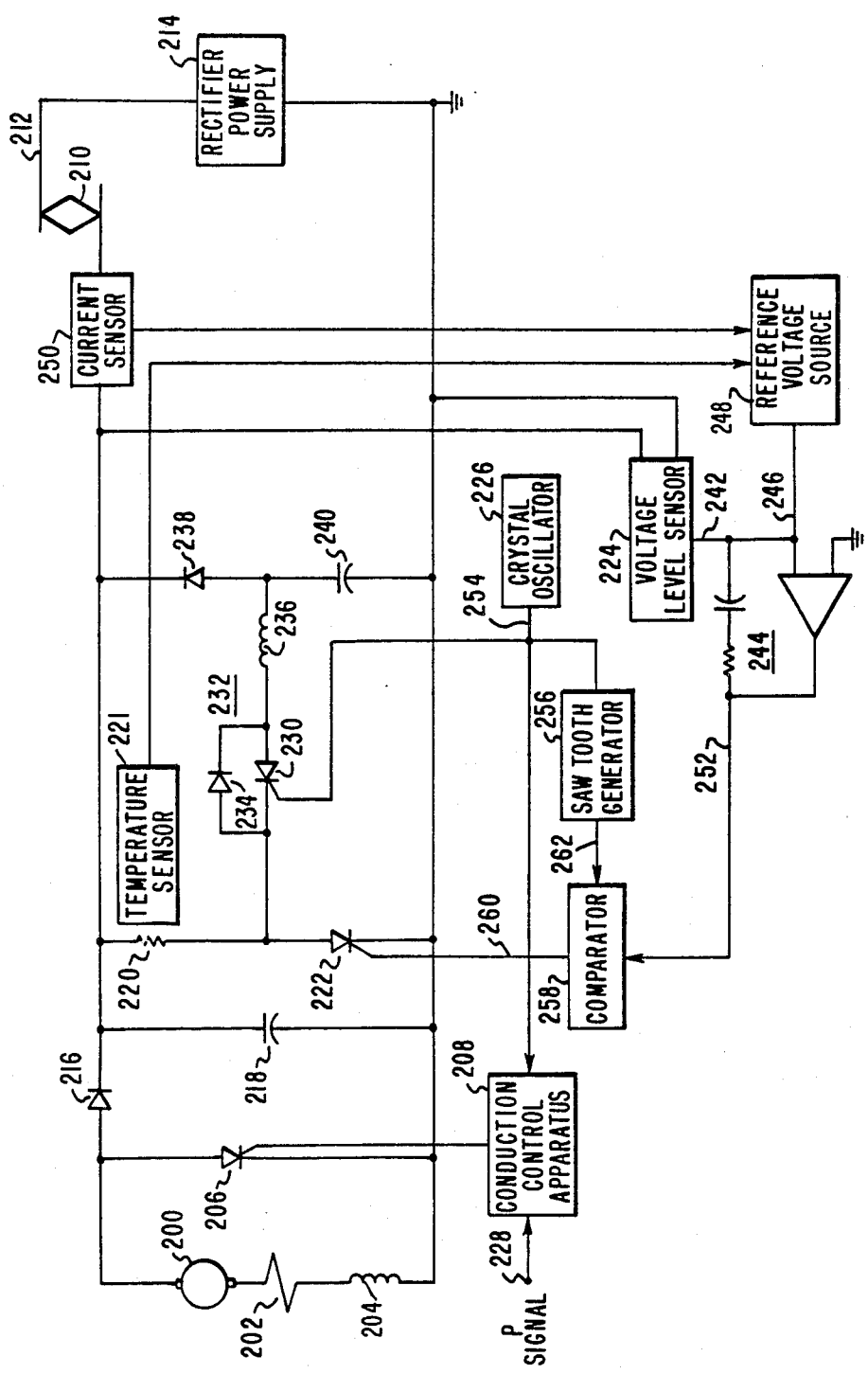
FIG. 2 schematically shows the transit vehicle dynamic and regenerative brake control apparatus of the present invention.

In FIG. 2 there is shown the electric brake control apparatus for a transit vehicle of the present invention. The vehicle motor 200 is connected in series with the motor field winding 202 and the motor reactor 204. A chopper thyristor 206 is connected across the motor and is provided with well-known firing and commutation conduction control circuits 208 to vary the conductivity of the chopper thyristor 206 to maintain the desired traction effort established by the effort control P signal 228. The motor 200 is energized through a collector 210 operative with a power supply line 212 connected to a typical rectifier power supply 214. The freewheeling diode 216 prevents the power supply from being short circuited across the conducting thyristor 206. A line filter capacitor 218 is connected across the thyristor 206. When the motor is operating in the vehicle brake mode and generating current, the generated energy that cannot be received by the power supply line 212 without causing the line voltage to increase above a desired reference is absorbed by the dynamic braking resistor 220 as determined by the conductivity of the series-connected thyristor switch 222. To control the conductivity of the dynamic brake thyristor 222 a voltage level sensor 224 is provided to sense the voltage across the line filter capacitor 218. A crystal oscillator 226, having a known frequency, such as 218 cycles per second, is connected to the conduction control apparatus 208 to fire the chopper thyristor 206 as required in accordance with the brake effort request P signal provided on input 228. The crystal oscillator 226 is connected to fire a brake commutation thyristor 230 operative in a commutation circuit 232 including a diode 234, an inductor 236, a diode 238 and a capacitor 240 for extinguishing the conductivity of the dynamic brake thyristor 222. In this way, the crystal oscillator 226 functions to synchronize the operation of the chopper thyristor 206 with the operation of the dynamic brake thyristor 222.

The filter capacitor voltage output 242 from the level sensor 224 is supplied to one input of a voltage regulator 244 for comparison with a maximum reference voltage 246 from a reference voltage source 248. The reference voltage source 248 is coupled with a current sensor 250 which senses the line current flow in relation to the power supply line 212. The voltage regulator 244 operates as a proportional plus integral controller to develop a voltage error signal 252 when the filter capacitor voltage 242 is greater than the reference voltage 246 and which has a magnitude proportional to the difference between the latter two voltages. The output pulse 254 from the crystal oscillator 226 is provided to a sawtooth wave generator 256 for providing a sawtooth output signal to a comparator 258 for each occurrence of the pulse 254. The voltage error signal 252 is supplied to the comparator 258 and the output 260 of the comparator 258 determines the conductivity of the thyristor 222 for a variable time interval proportional to the magnitude of the voltage error signal 252.

Figure 3A:
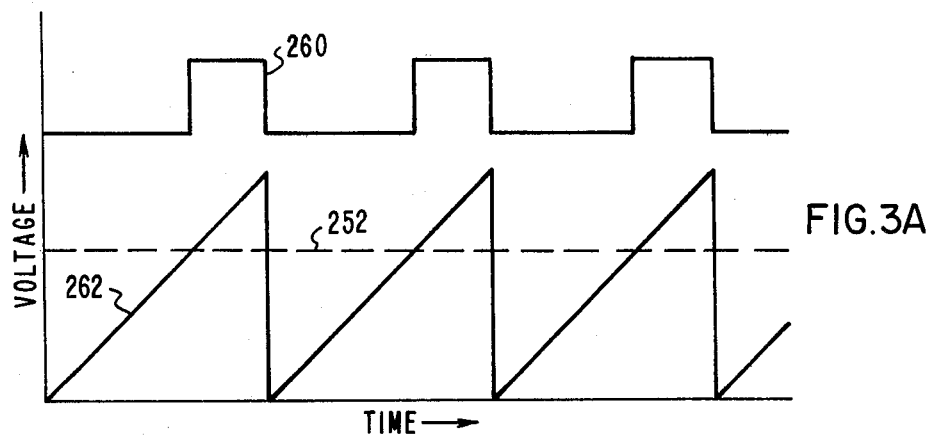
FIGS. 3A and 3B illustrate the operation of the brake control apparatus shown in FIG. 2.
Figure 3B:
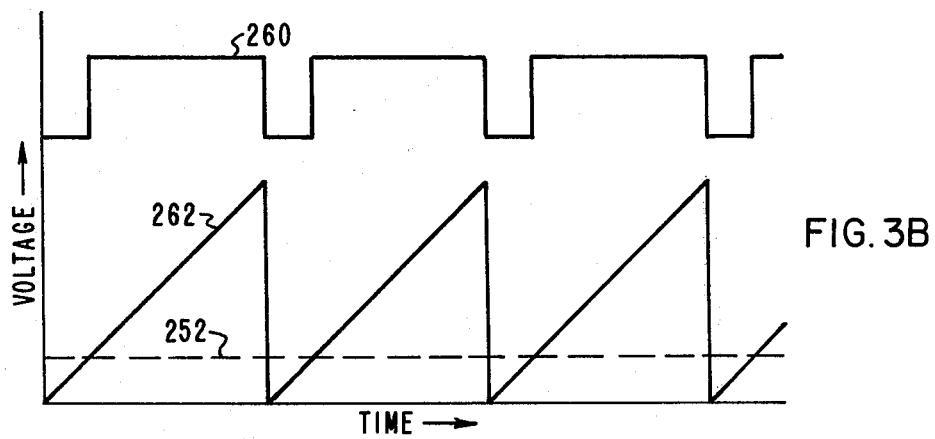

In FIG. 3A there is illustrated the operation of the comparator 258 to provide an output signal 260 that is pulse width modulated in response to the magnitude of the voltage error signal 252. In FIG. 3A there is shown the output signal 262 from the sawtooth generator 256 in relation to the voltage error signal 252, and the output signal 260 resulting from the comparison of the voltages 262 and 252 by the comparator 258. In FIG. 3B the voltage 262 is shown in relation to a larger magnitude of the voltage 252 to provide the voltage 260 having a larger pulse width time duration than was provided in the illustration of FIG. 3A. The conductivity of the thyristor 222 is determined by the voltage 260 and is longer in time for the illustration of FIG. 3B to provide an increased absorption of generated energy by the dynamic brake resistor 220 where the voltage error signal 252 is greater in magnitude than for the illustration of FIG. 3A. The time occurrence when the voltage 252 crosses the rising portion of the sawtooth voltage 262 is when the thyristor 222 is turned on. The turnoff of the thyristor 222 is determined by the next output pulse from the crystal oscillator 226 operative with the commutation circuit 232.

Figure 4:
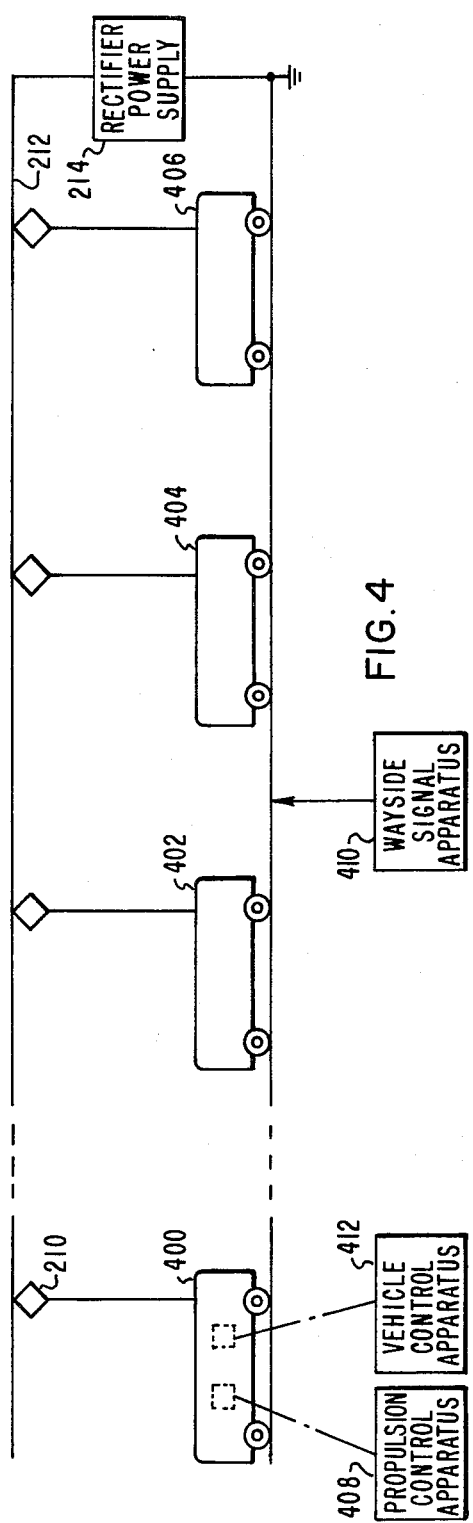
FIG. 4 illustrates the operation of a power supply line with a plurality of transit vehicles in relation to determining the suitability of regenerating power into the power supply line.

In FIG. 4 there is shown the operation of power supply line 212 and power supply 214 with a plurality of transit vehicles 400, 402, 404 and 406. There is an electric brake control apparatus such as shown in FIG. 2 provided for each of the vehicles operative with the power supply line 212. Each of the vehicles includes a propulsion control apparatus 408 and vehicle control apparatus 412 for controlling the speed of the vehicle, and a wayside signal apparatus 410 is operative with selected signal blocks of the roadway track as described in an article published in the Westinghouse Engineer for September, 1972 at pages 145–151 and entitled "Automatic Train Control Concepts Are Implemented by Modern Equipment".

If the vehicle 400 is in the electric brake mode of operation, it provides regenerated current from the motor 200 as shown in FIG. 2 and as determined by the operation of chopper thyristor 206 through the collector 210 to the power supply line 212. A current sensor 250 is provided to determine if the current is flowing from the motor 200 to the line 212 or if the current is flowing from the line 212 to the motor control apparatus as shown in FIG. 2. If, in fact, the current sensor determines that current is flowing from the line 212 to the motor control apparatus as shown in FIG. 2, which can happen when the reference voltage source 248 for the vehicle 400 provides a lower reference voltage signal 246 than does the corresponding control apparatus for another vehicle in the electric brake mode and operative with the same power supply line 212, a difference of less than 2 percent where the vehicle 400 was operating with the reference voltage 246 of 900 volts and the other vehicle, for example, the vehicle 404 was operating with a reference voltage of 910 volts, could result in the electric brake generated current from the vehicle 404 being supplied to the resistor 220 of the braking control apparatus for the vehicle 400. The current sensor 250 would sense the direction and magnitude of this current flow from the power supply line 212 into the brake control apparatus shown in FIG. 2, and more specifically into the dynamic brake resistor 220 which might have a resistance of about 1 ohm, and operates with the reference voltage source 248 to increase the reference voltage 246 as required to more closely balance and equalize the current flow of the dynamic brake resistor 220 for the vehicle 400 in relation to the current flow in the corresponding resistor of the one or more other vehicles supplying electric brake generated current to the power supply line 212.

Figure 5:
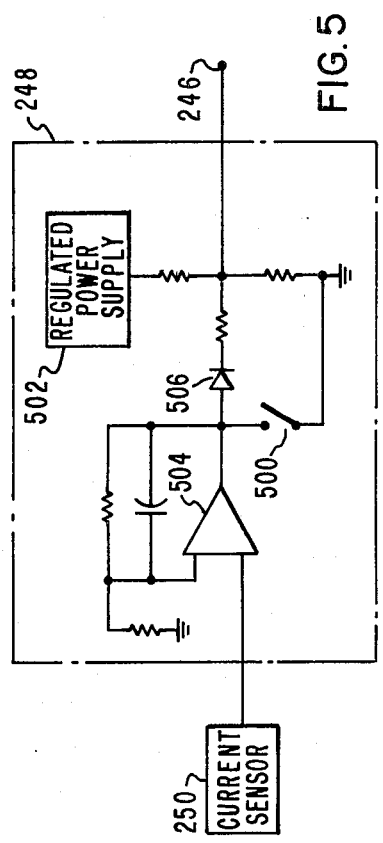
FIG. 5 shows voltage current wave forms to illustrate the operation of the present invention.

In FIG. 5 there is shown one suitable and well known to persons skilled in this art, reference voltage modification circuit, which would operate with the reference voltage source 248 when current flow is from the line 212 into the vehicle 400 to raise the reference voltage 246. In this way, the dynamic brake resistor 220 of the car 400 would not be damaged by excessive current flow from the combined brake generated current from the vehicle 400 and additional brake generated current from another vehicle operative with the same power supply line 212. The switch 500 would be closed in the power mode of car 400 to prevent responding to the positive current flow from the line 212 during the power mode of operation of vehicle 400. If desired, this same balancing of relative brake generated current flows from more than one vehicle in relation to the power supply line 212 can be readily done by persons skilled in this art with a programmed microprocessor responsive to the direction and magnitude of the current flow sensed by the sensor 250 in the electric brake mode of operation. The circuit of FIG. 5 would operate to modify the reference voltage 246 as needed. If the vehicle 400 is the only one operating in the brake mode in relation to the line 212 as well as if the vehicle 400 were supplying brake current to another vehicle, then the reference voltage 246 of vehicle 400 would not have to be modified. If the voltage of line 212 as sensed by the voltage across the filter capacitor 218 does not go above the reference voltage 246 in relation to the vehicle 400, then the thyristor 222 would not be fired to become conductive. When the voltage error 252 is large, then the thyristor 222 would be conductive for a correspondingly longer period of time.

The reference voltage modification circuit of FIG. 5 operates with the voltage reference source 248 and the voltage reference 246 normally set by adjustment of the regulated power supply 502. However, if the current sensor 250 detects a brake mode current flow from the supply line 212 into the resistor 220 of the control apparatus shown in FIG. 2, a positive output signal is provided by the current sensor 250 through the amplifier 504 and the diode 506 to force the voltage reference 246 to a higher voltage level, which will result in a corresponding decrease in this brake mode current flow from the supply line 212. In the power mode, the switch 500 and the diode 506 prevents the positive output signal from the current sensor 250 from modifying the voltage reference 246.

If desired, the vehicle 400 could operate to accept excess brake-generated current from the line 212 when the vehicle 400 is not in the electric brake mode and not in the power mode such as when the vehicle 400 is parked in a passenger station. It is possible that some other vehicle has an inoperative dynamic brake resistor circuit for some reason and by enabling the vehicle 400 to accept brake-generated current from that other vehicle, permits that other vehicle to utilize electric braking. This also would permit each vehicle to be provided with a partial dynamic brake resistor capacity to save space on-board the vehicle and to save the expense of the additional dynamic brake resistor capacity. By providing a reference voltage modification circuit such as shown in FIG. 5 that senses the magnitude of excess current received by the vehicle 400 from the line 212 and determines for how long the excess current has been received, it could be established that the vehicle 400 was being overloaded before the reference voltage 246 was increased to reduce the current received by the vehicle 400. A temperature sensing device 221 operative with the brake resistor 200 and operative with the reference voltage source 248 could operate to raise the voltage reference 246 when an undesired temperature condition was detected and would modify this reference voltage 246 as necessary to reduce any undesired brake current absorbed by the resistor 220 from the line 212.

Figure 6:
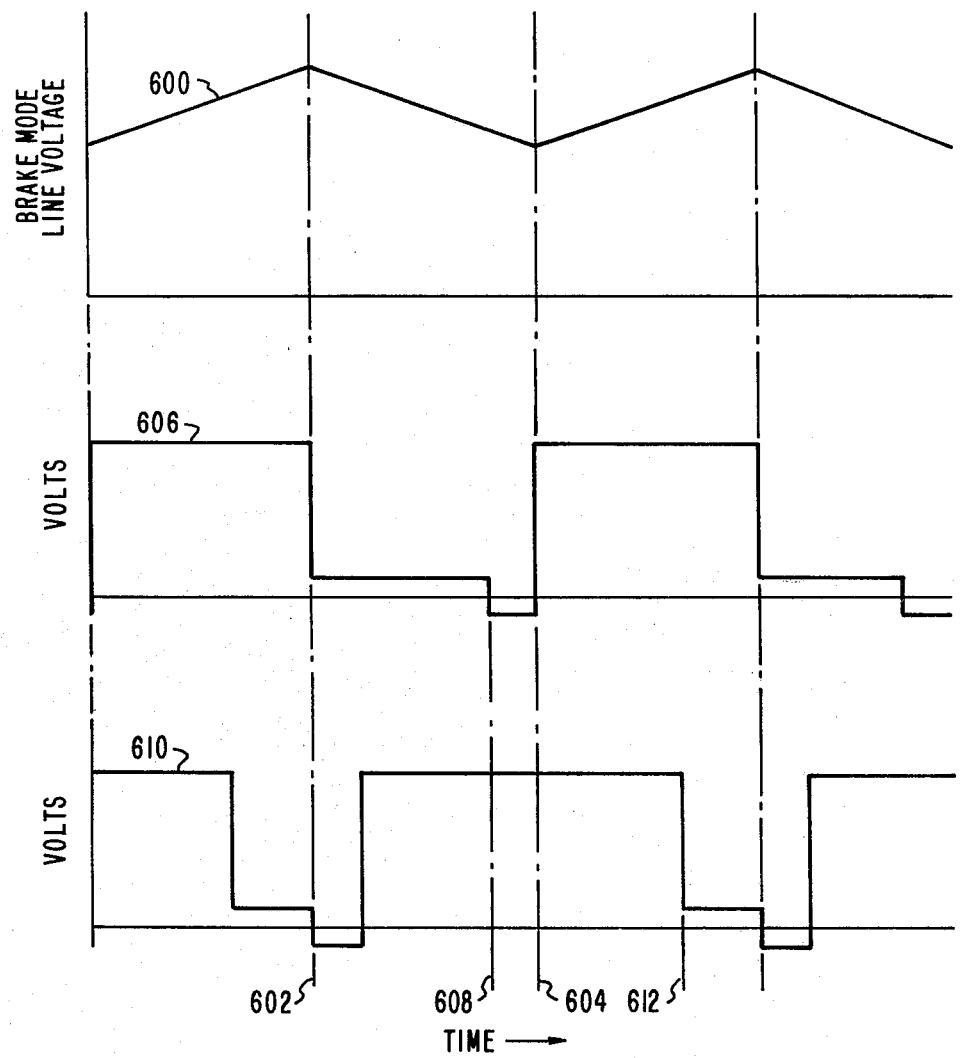
FIG. 6 shows voltage and current wave forms to illustrate the operation of the apparatus shown in FIG. 2; and In FIGS. 7A, 7B and 7C there is shown the improved operation provided by the control apparatus shown in FIG. 2.

In FIG. 6 there are shown voltage and current wave forms to illustrate the operation of the apparatus shown in FIG. 2 and in accordance with the present invention.

The curve 600 shows the brake mode voltage of the line 212, and shows that the line voltage goes down when the chopper thyristor 206 is made conducting at time 602 and goes up when the chopper thyristor 206 is made not conducting at time 604. At time 602 the chopper thyristor 206 is made conducting and the brake turnoff commutation thyristor 230 is made conducting to terminate any conduction by the brake thyristor 222. The curve 606 shows the voltage across the chopper thryistor 206. At time 608 the commutating thyristor for the chopper thyristor 206 is fired, as described in the above-referenced published article in the Westinghouse Engineer for March, 1973 in relation to the turn-off thyristor for the chopper, which causes the voltage shown by curve 606 across the chopper thyristor 206 to increase. The curve 610 shows the voltage across the brake thyristor 222. At time 612 the brake thyristor 222 is made conducting in accordance with the teachings of the present invention. At time 602 the brake thyristor 222 is turned off when the chopper thyristor 206 is turned on.

In FIGS. 7A, 7B and 7C there is shown the improved operation provided by the control apparatus shown in FIG. 2 and in relation to the well-known wayside signalling apparatus 410 shown in FIG. 4. In FIG. 7A there is shown the operation of the present control apparatus with a known frequency of operation determined by the crystal oscillator 226 and having an output frequency selected in relation to the known frequency of an input speed command signal from the wayside signal apparatus 410, such as described in U.S. Pat. No. 3,810,161 of A. P. Sahasrabudhe and including a bandpass filter provided for each desired input signal. The frequency band pass of that filter is shown in FIG. 7A to fall between the known harmonic operational frequencies of the control apparatus shown in FIG. 2, and as determined by the crystal oscillator 226. In FIG. 7B there is shown the harmonic frequency conflict with this filter band pass by the control apparatus of FIG. 1 for a high frequency of operation, and in FIG. 7C there is shown the harmonic frequency conflict with this filter band pass by the control apparatus of FIG. 1 for a low frequency of operation.

The prior art apparatus of FIG. 1 senses the line voltage level as measured through the dynamic braking resistor 10. When the switch thyristor 11 is fired to become conductive, and since the energy in the capacitor is then pulled out through the resistor 10, the ability of the level sensor 12 to sense this voltage is lost and a certain time delay is provided by the delay circuit 15 to open the switch thyristor 11. In FIG. 2, the present control apparatus continuously measures the voltage across the capacitor 218 and regulates this voltage to a reference value 246 in terms of value and rate of rise of the voltage across the capacitor 218. The turn on of the switch thyristor 222 is thereby modified by the magnitude of the error voltage 252, so for a low motor generated current supplied to the line 212 the error voltage 252 is different than for a high motor generated current supplied to the line 212. In addition, the crystal oscillator 226 provides a controlled frequency of operation of the switch thyristor 222 with the error voltage 252 determining the time duration of each conductivity of the switch thyristor 222 to better coordinate the noise operation of the propulsion motor control apparatus shown in FIG. 2 with the speed control equipment 412 on board the vehicle and operative with the well-known wayside signalling apparatus 410. The motor control apparatus shown in FIG. 2 permits any noise harmonics resulting from the operation of the chopper thyristor 206 or the dynamic brake switch thyristor 222 to be so established in frequency as to minimize conflict with known speed and vehicle control signal frequencies from the wayside signal apparatus 410 as shown in FIG. 4.

I claim:

1. In control apparatus for a motor coupled with a vehicle and including a chopper apparatus in the brake mode to supply current to a power supply line, with a filter capacitor connected across said chopper apparatus, the combination of:
   means for producing a voltage signal in accordance with the voltage across said filter capacitor,
   brake control means connected across said filter capacitor,
   means responsive to the current flow in relation to the power line for providing a desired reference voltage for said filter capacitor and having a value determined by said current flow,
   means responsive to said voltage signal for providing an error signal in relation to said desired reference voltage value for said filter capacitor voltage,
   means connected with said chopper apparatus for providing a control signal having a known frequency for determining the operation of said chopper apparatus in accordance with said known frequency, and
   signal means responsive to each of the error signal and the control signal and connected with said brake control means for determining the operation of the brake control means in accordance with said known frequency and for a time period proportional to the magnitude of said error signal.

2. The control apparatus of claim 1, with said current flow responsive means being responsive to the current flow from said power supply line to said control apparatus for modifying the desired reference voltage value to determine the operation of said brake control means.

3. The control apparatus of claim 1, with the current flow responsive means being operative to limit current flow from the power supply line into the brake control means by increasing the desired reference voltage value when said current flow becomes greater than is desired.

4. In the method of controlling a motor coupled with a vehicle and operative with a chopper apparatus in the brake mode to supply current to a power supply line, with a filter capacitor being connected across the chopper apparatus and a dynamic brake circuit being connected across the filter capacitor, the steps of
   providing an actual voltage signal in accordance with the actual voltage across said filter capacitor,
   providing a reference voltage signal in accordance with a desired value for said filter capacitor voltage,
   sensing the current flow in relation to said power line for determining the magnitude of said reference voltage signal in accordance with the direction and magnitude of said current flow, developing a voltage error signal in response to said actual voltage signal and said reference voltage signal, controlling the operation of the chopper apparatus with a control signal having a predetermined frequency, and controlling the operation of the dynamic brake circuit in response to said control signal and in response to the voltage error signal for determining the conductivity of the dynamic brake circuit to establish the absorption of brake energy from the motor and the supply of current in relation to the power supply line.

5. The method of controlling a motor of claim 1, with the magnitude of the voltage error signal determining the conductivity time period of the dynamic brake circuit.

6. The method of controlling a motor of claim 4, with the step of sensing the current flow in relation to the power supply line increasing the reference voltage signal when a current flow is sensed from the power supply line to the dynamic brake circuit.

* * * * *